United States Patent Office 3,657,190
Patented Apr. 18, 1972

3,657,190
METHOD FOR FORMING PYRRONE MOLDING POWDERS AND PRODUCTS OF SAID METHOD
Charles T. Hughes, Carlisle, and Robert J. McHenry, Acton, Mass., assignors to Avco Corporation, Cincinnati, Ohio
No Drawing. Filed Nov. 17, 1969, Ser. No. 877,445
Int. Cl. C08g 20/32
U.S. Cl. 260—65                                   7 Claims

ABSTRACT OF THE DISCLOSURE

The present invention relates to the formation of improved pyrrone resins of the ladder or semi-ladder structure. The technique involves initial formation of fully cyclized prepolymers having an average degree of polymerization of about 1.5, one with acidic terminal groups, another with amine terminal groups. Thereafter the prepolymers are intimately admixed on a 1:1 stoichiometric basis. The resulting powder mixture is molded at elevated pressures and temperatures to form a fully cyclized resin.

---

The present invention relates to a method of synthesizing void free pyrrone polymers through a unique prepolymer technique.

The invention described herein was made in the performance of work under an NASA contract and is subject to the provisions of Section 305 of the National Aeronautics and Space Act of 1958, Public Law 85–568 (72 Stat. 435, 42 U.S.C. 2457).

Heteroaromatic polymers derived from aromatic orthotetraamines and dianhydrides or di-acids and their derivatives have been variously referred to in the literature by a variety of names such as polyimidazopyrrolones, polybenzimidazolimides, and polybenzimidazolones, polybenzoylenebenzimidazoles, poly(isoindolobenimidazoles), polybenzimidazopyrrolones, and polybenzimidazobenzophenanthrolines. The designation "pyrrones" has been proposed for this general class of polymers and will hereafter be used as the generic term therefor to include all such structures.

As a class, the pyrrones are characterized by a high degree of thermal stability and high resistance to degradation by high energy ionizing radiation. They are useful for laminates and high density moldings where such characteristic are paramount, e.g. in aerospace structures. Generally, speaking, the pyrrones are ladder two-strand polymers, since their theoretical structures have segments of four or more fused aromatic and heterocyclic rings connected by single bonds. If either monomer has single bond attachments therein only a partial, semi-ladder of stepladder structure results.

An example of the complete ladder structure is illustrated by the action of 1,2,4,5-tetraaminobenzene with pyromellitic dianhydride:

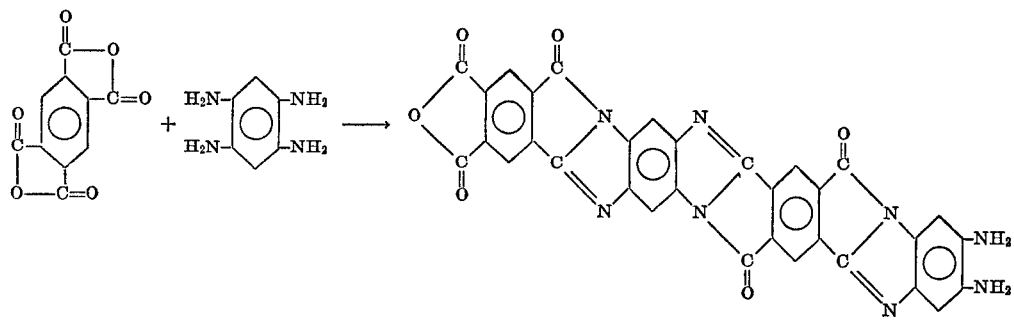

An example of a semi-ladder structure is afforded by the reaction product of 3,3'-diaminobenzidine and 3,3',4,4'-benzophenone tetracarboxylic dianhydride to form:

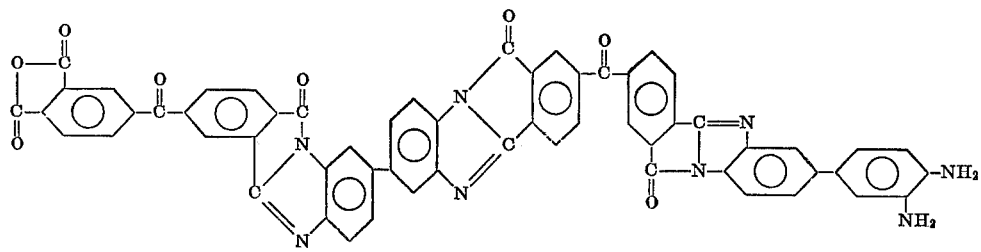

The pyrrone polymers have been synthesized by room temperature addition of a solution of the dianhydride to a stirred solution of the tetraamine in equimolar proportions. There results a moderate increase in temperature and a viscous solution of a polyamide containing unreacted amino and carboxyl groups. When the polyamide solution is heated, solvent is evaporated and the polymer is formed through a carboxylpolybenzimidazole stage, or an amino-polyimide stage, or both, by elimination of water. Continued application of heat leads to further condensation and ultimately to the fused imidazopyrrolone structure.

The condensed ring polymers have a very rigid molecular structure which results in high glass transition temperatures, they exhibit almost no flow in their fully cyclized high-molecular weight form, even prior to branching or cross-linking reactions. Even moderately high-molecular weight prepolymers do not flow when subjected to conventonal high processing temperatures and pressures (e.g. above 600° F. and in excess of 200 p.s.i.g.). Moreover, the high molecular weight fully cyclized pyrrone polymers are generally insoluble, so that flow cannot be effected by plasticization or solvation. The lack of flow of the pyrrones has required the use of various flowable precursor or prepolymer materials in the final molding steps.

One approach suggested to the art involves formation of long-chain high-molecular weight precursor polymers having flexible bonds which subsequently are ridigified through cyclization during the course of final cure. An instance of such an approach is in the synthesis of polyimide resins through a polyamide acid stage which, subsequently, is cyclized to the polyimide as shown below:

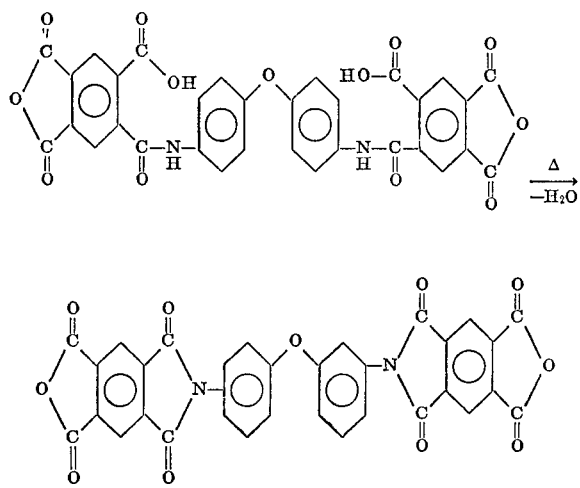

Generally cyclization of pyrrones involves a condensation reaction which eliminates one or more molecules of water per monomer unit, and this low molecular weight water co-product must be removed nearly completely to obtain optimum properties for the final cured resin.

Polybenzimidazole resins, on the other hand, have been molded through the use of a low molecular weight prepolymer formed by the melting action of approximately stoichiometric amounts of the comonomers. A limitation of molecular weight to a relatively low level is required to obtain the flow is achieved by control of reaction, time, temperatures and choice of starting materials.

Several disadvantages exist in use of flexible precursor polymers as prepolymers for the pyrrone resins. All or almost all the volatile condensation products generated by formation of the condensed ring structure are released during the curing step in the processing. In consequence severe problems of volatile removal exist. Commonly low density, voidy parts result. Sometimes the ring forming reaction is inhibited, with consequent lower thermal and oxidative stability in the final product. In addition, when the prepolymers are handled in solution, which generally is the case, tenaciously held solvent must also be removed as part of the curing process, aggravating the problem of removing volatile products. Since the ring formation reactions are carried out in a concentrated bulk material a relative increase in the extent of the competing side reactions often results, causing more branched chains and crosslinks in the polymer product, instead of the desired thermally stable condensed ring structure.

Similar disadvantages exist in the instance of the stoichiometrically-reacted, low-molecular weight prepolymer as has been suggested for the benzimidazole resins. There the chain extension reaction which forms higher molecular weight, uncyclized polymer is favored over the ring-closing condensation to form less flowable prepolymers and requiring more of the cyclization to occur during final curing. The conditions under which the cyclization occurs are such that branching and other weak links may be introduct into the polymer chain.

The object of the present invention is to provide a procedure which facilitates formation of pyrrone polymers.

Another object of this invention is to provide a pyrrone forming procedure which reduces the quantity of volatile products evolved during final curing of the polymers.

A further object of the invention is to provide a method for obtaining void free fully cyclized pyrrone polymers.

Still another object of the invention is to provide fully cyclized pyrrone prepolymers in powder form.

Briefly stated, the present invention contemplates formation of fully cyclized pyrrone prepolymers having an average degree of polymerization of 1.5–5.5. These fully cyclized prepolymers of controlled molecular weight are formed respectively through reaction of a large excess of one comonomer (A) with the other comonomer (B), and through reaction of a large excess of (B) with (A). The molecular weight distributions in the prepolymer products are controlled by the actual ratio of the monomers used, with higher monomer ratios, e.g. of (B) to (A) causing lower average molecular weight and narrower polymer distribution. Reactant ratios of the monomers should be in the range of 1.5:1 to 5:1. For pure resin molding compounds mole ratios of about 2:1 of (B) to (A) in one prepolymer and (A) to (B) in the other prepolymer are preferred, the products then having an apparent overall degree of polymerization of 1.5.

However, the actual prepolymer reaction product will have some portion with a higher degree of polymerization than 1.5 as well as some unreacted monomer. When high flow characteristics are desired in the molding powder, reactant ratios far in excess of 2:1 should be employed along with provision subsequently for extraction of unreacted monomer from the oligomer mixture. In addition, the oligomer may be purified to remove unreacted monomer or polymer with too high a degree of polymerization, e.g. D.P. 6.5 and higher. However, with reactant mole ratios near the 5:1 ratio production of oligomers with D.P. 6.5 and higher is minimal.

The actual reaction of dianhydrides and diamines seems to follow a pattern consistant with theoretical studies in which monomer mole ratios of 2:1 used for oligomer production result in about 75% D.P. 1.5 to 5.5, about 17% of unreacted monomer and only 8% D.P. above 5.5 in the reaction product. The prepolymer products may therefore be defined as oligomer with a D.P. ranging from 1.5–5.5, with one oligomer endcapped with anhydride or acid groups and the other oligomer endcapped with amine groups.

The following table illustrates the distribution which may be expected with representative monomer mole ratios.

WEIGHT FRACTION FOR VARIOUS MONOMER RATIO

| Monomer mole ratio | 1:1.5 | 1:2 | 1:2.5 | 1:3 | 1:4 | 1:5 |
|---|---|---|---|---|---|---|
| D.P. 1/2 | 0.0667 | 0.167 | 0.257 | 0.333 | 0.45 | 0.533 |
| D.P. 3/2 | 0.1333 | 0.250 | 0.309 | 0.303 | 0.338 | 0.32 |
| D.P. 5/2 | 0.148 | 0.208 | 0.206 | 0.185 | 0.141 | 0.107 |
| D.P. 7/2 | 0.138 | 0.146 | 0.115 | 0.086 | 0.049 | 0.030 |
| D.P. 9/2 | 0.119 | 0.094 | 0.059 | 0.037 | 0.016 | 0.008 |
| D.P. 11/2 | 0.097 | 0.057 | 0.029 | 0.015 | 0.005 | 0.002 |
| Total to D.P. 11/2 | 0.7010 | 0.922 | 0.975 | 0.969 | 0.999 | 0.998 |
| Average D.P. | 2.5 | 1½ | 1⅙ | 1 | 0.833 | 0.75 |

To prevent branching, rather than cyclization, the oligomer reaction should be carried out at an elevated temperature and, or alternatively, in dilute solution. Also important is maintenance of an excess of one reactant, i.e. anhydride over amine, amine over anhydride, at every point in the reaction mixture (to prevent chain extension and possible gellation). This can be accomplished by adding anhydride dropwise to a vigorously agitated solution of amine in the instance of amine endcapped prepolymer, and amine dropwise to a vigorously agitated solution anhydride in the instance of anhydride endcapped prepolymer.

Thereafter solutions of the two oligomers or prepolymers are cooled then mixed together at relatively low temperatures and thereafter the prepolymers precipitated promptly, e.g. by pouring the mixture into a non-solvent for the oligomers. This technique provides a powder precipitate which is a molecular mixture of the two oligomers with the least amount of flow robbing chain extension during the admixing. Mixing proportions of the two oligomer solutions are selected to give, overall, about 1:1 anhydride-amine prepolymer stoichiometric ratio. If the solution temperature is high enough for chain extension reaction, and if the time of mixing is not very short, some degree of chain extension may occur during the mixing and precipitation procedure. For example, mixing pyrrone prepolymer solutions at 350° F. will result in some chain extension, but sufficient flow will still result to obtain good product properties from high pressure molding.

Practice of the present invention reduces the volatiles generated during final cure of the pyrrone polymer. In consequence pyrrone polymer moldings made thereby are largely void free. In addition the resulting pyrrones exhibit substantially higher flexural properties, especially at temperatures of 500° F. and above. Also the pyrrones exhibit substantially improved oxidation resistance.

For further understanding of the invention, the following specific examples thereof are provided:

EXAMPLE I

Pyromelletic dianhydride (PMDA) and 1,2,4,5- tetraaminobenzene (TAB) were dissolved separately in dimethyl formamide.

In a pressure vessel two moles of PMDA in solution was heated to a reaction temperature of just over 200° C. and one mole of the TAB added dropwise to the stirred PMDA, with continued heating and venting of the steam co-product as the reaction proceeded.

The reaction creates a fully cyclized prepolymer D.P. 1.5 in about 25% yield having the following structure:

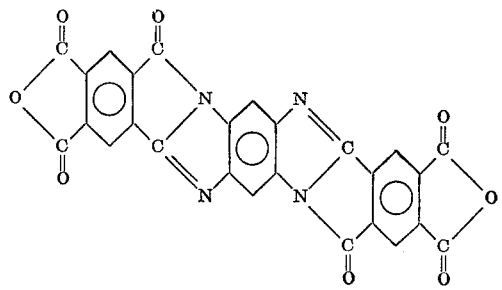

The balance is monomer (17%), fully cyclized prepolymer of higher degrees of polymerization with 92% D.P. 5.5 and below. All of the reaction product seems to remain in solution.

In like fashion two moles of TAB in solution was reacted with one mole of PMDA added dropwise under pressure and at just about 200° C.

The reaction creates a fully cyclized prepolymer D.P. 1.5 in about 25% yield having the following structure:

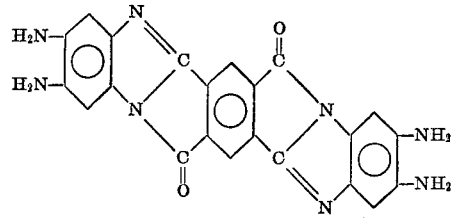

The balance is monomer (17%), and fully cyclized prepolymer of higher degrees of polymerization with 92% D.P. 5.5 and below. All of the reaction product seems to remain in solution.

Equi-molar quantities of the above prepolymer solutions, without purification to remove monomer or high D.P. material were cooled to −10° C. then poured into cold water (with stirring), co-precipitating the oligomers in powder form. After drying, the powdered oligomer mixture was suitable for compression molding (e.g. at over 600° F. and more than 200 p.s.i.g.) into void-free pure resin products.

The same procedure was followed to react separately TAB with PMDA and PMDA with TAB using 5:1 mole reactant ratios. In this instance the oligomer reaction products had about 53% unreacted monomer, 32% D.P. 1.5, 11% D.P. 2.5 and less than 1% D.P. 5.5 and higher. Each reaction mixture was poured into cold water, precipitating the oligomer, then washed twice to remove the solvent.

The amine endcapped oligomer was extracted with boiling water in a Soxlet extractor to remove unreacted amine monomer. The anhydride endcapped oligomer was extracted with cyclohexanone to remove unreacted anhydride.

The oligomers were separately dissolved in benzene sulfonic acid (at 60° C.). Then the oligomer solutions were admixed in equi-molar quantities and promptly poured into cold stirred water to co-precipitate the oligomers. After drying, the prepolymer powder was suitable for compression molding into pure or filled resin products (e.g. at over 600° F. and more than 200 p.s.i.g.).

EXAMPLE II

The same reaction procedure as in Example I using hexamethyl phosphoramide as the solvent was employed to form prepolymers with 1,4,5,8 naphthalene tetracarboxylic acid anhydride and 2,3,6,7 tetraamine quinoxaline, 2:1 and 1:2 ratios.

Equi-molar quantities of the two prepolymer solutions were admixed (still hot), cooled somewhat, then cooled further and diluted by addition of ten volumes of cold water, which precipitates the prepolymers. The powder was then dried. It is satisfactory for molding of pure resin products.

EXAMPLE III

The same procedure as in Example I produced a molding powder from pyrazine tetracarboxylic acid dianhydride and 3,3',4,4' tetramino biphenyl ether using polyphosphoric acid as the solvent. The final precipitate must be washed free of acid before drying.

EXAMPLE IV

The same procedure as in Example I produced a molding powder from 2,3,6,7 quinoxaline tetracarboxylic acid dianhydride and 3,3',4,4' tetraamino biphenyl methane using p-toluene sulfonic acid as the solvent. The final precipitate must be washed free of acid before drying.

EXAMPLE V

The same procedure as in Example I produced a molding powder from 2,3,6,7 naphthalene tetracarboxylic acid dianhydride and 1,4,5,8 tetraamino naphthalene using dimethyl acetamide as the solvent.

EXAMPLE VI

The same procedure as in Example I produced a molding powder from 3,3',4,4' benzophenone tetracarboxylic acid dianhydride and diamino benzidine (3,3',4,4' tetramine biphenyl), using benzene sulfonic acid as the solvent. The final precipitate must be washed free of acid before drying.

EXAMPLE VII

The same procedure as in Example II produced a molding powder from pyromellic dianhydride and 2,3,6,7 tetraamino naphthalene using hexamethyl phosphoramide as the solvent.

What is claimed is:

1. A process for preparing a pyrrone molding powder which comprises admixing in about equimolar quantities (I) a solution of a fully cyclized prepolymer having a degree of polymerization below about 5.5 and being endcapped with amino groups, said prepolymer having been prepared by reacting an excess of an aromatic tetramine with an aromatic tetracarboxylic acid dianhydride, with (II) a solution of a fully cyclized prepolymer having a degree of polymerization below about 5.5 and being encapped with acidic groups, said prepolymer having been prepared by reacting an excess of an aromatic tetracarboxylic acid dianhydride with an aromatic tetramine, and thereafter precipitating the mixture of prepolymers as a powder precipitate from the solution.

2. The pyrrone molding powder prepared by the process of claim 1.

3. The process of claim 5 wherein each amine reactant is 1,2,4,5-tetraaminobenzene and each acid anhydrine reactant is pyromelletic dianhydride.

4. The process of claim 5 wherein each amine reactant is diaminobenzidine and each acid anhydride reactant is 3,3',4,4.-benzophenone tetracarboxylic acid dianhydride.

5. The molding powder of claim 2 wherein both prepolymers are formed from 1,2,4,5-tetraaminobenzene and pyromelletic dianhydride.

6. The molding powder of claim 2 wherein both prepolymers are formed from diamine benzidine and 3,3',4,4'-benzophenone tetracarboxylic acid dianhydride.

7. The process of claim 1 wherein the acid anhydride to amine molar ratio of the reactants for the acidic group endcapped prepolymer is about 1.5:1 to 5:1, and for the amino group endcapped prepolymer is about 1:1.5 to 1:5.

References Cited

UNITED STATES PATENTS

| | | | |
|---|---|---|---|
| 3,505,295 | 4/1970 | Grunsteidl et al. | 260—77.5 |
| 3,532,673 | 10/1970 | Bell et al. | 260—78 |
| 3,549,594 | 12/1970 | Twilley et al. | 260—47 |
| 3,414,543 | 12/1968 | Paufler | 260—47 |
| 3,518,232 | 6/1970 | Bell | 260—78 |

WILLIAM SHORT, Primary Examiner

L. L. LEE, Assistant Examiner

U.S. Cl. X.R.

260—30.6 R, 30.8 R, 32.6 N, 470 CP, 78 TF, 309.2

PO-1050
(5/69)

UNITED STATES PATENT OFFICE
CERTIFICATE OF CORRECTION

Patent No. __3,657,190__  Dated __April 18, 1972__

Inventor(s) __Charles T. Hughes, and Robert J. McHenry__

It is certified that error appears in the above-identified patent and that said Letters Patent are hereby corrected as shown below:

Column 4, line 22, for "introduct", read---introduced---;

Claim 3, Column 8, line 5, for "anhydrine", read---anhydride---;

Claim 4, Column 8, line 8, for "4,4", read---4,4'---.

Signed and sealed this 8th day of May 1973.

(SEAL)
Attest:

EDWARD M.FLETCHER,JR.
Attesting Officer

ROBERT GOTTSCHALK
Commissioner of Patents